Patented Jan. 5, 1954

2,665,261

UNITED STATES PATENT OFFICE 2,665,261

PRODUCTION OF ARTICLES OF HIGH IMPACT STRENGTH

Theodore C. Baker, Toledo, Ohio, assignor, by mesne assignments, to Allied Chemical & Dye Corporation, New York, N. Y., a corporation of New York No Drawing. Application May 12, 1950, Serial No. 161,741

12 Claims. (Cl. 260—17.3)

The invention relates to the production of articles of high impact strength, and more particularly to the production of a novel cellulose-filled composition capable of being molded to produce articles of superior impact strength.

In the production of a cellulose-filled molding composition, it is necessary that the cellulose filler be impregnated thoroughly by the substance that is used as a binder. The presence of any unimpregnated cellulose in such a composition seriously impairs the water-resistance of articles molded from the composition, because of the fact that unimpregnated cellulose readily absorbs water. However, the thorough impregnation of the cellulose by the binder that is necessary in order that articles molded from the composition may have satisfactory water resistance at the same time causes articles molded from the composition to be lacking in impact strength.

The principal object of the invention is to provide a cellulose-filled composition in which the cellulose filler is thoroughly impregnated by a binder but which is capable of being molded to produce articles of superior impact strength. More specific objects and advantages are apparent from the description, which illustrates and discloses but is not intended to limit the scope of the invention.

It is now believed that the lack of impact strength in articles molded from the cellulose-filled composition heretofore known is due to the great strength of the bond between the cellulose and the binder with which the cellulose is impregnated. It has not been possible to avoid a strong bond by avoiding impregnation of the cellulose by the binder, because lack of impregnation of the cellulose by the binder causes articles molded from the composition to have unsatisfactory water-resistance.

The present invention is based upon the discovery that when a cellulose filler, having bonded thereto molecules each of which contains a monovalent hydrocarbon radical having not less than 8 carbon atoms, is impregnated with a polar thermosetting substance, the resulting composition is capable of being molded to produce articles that not only have satisfactory water resistance but also have superior impact strength. Such molecules, when bonded to a cellulose filler, apparently reduce the strength of the bond between a polar thermosetting substance and the cellulose filler. The reduced strength of this bond is believed to permit failure or cleavage to occur between the polar thermosetting substance and the cellulose filler when an article molded from the composition is subjected to an impact. Such cleavage permits the energy of the impact to be absorbed without shattering the article. If such cleavage could not occur, the article would be too rigid so that it would be shattered by the impact. The cleavage that takes place in an article molded from a composition embodying the invention occurs at a very great number of widely dispersed points in the article, so that the article after being subjected to a severe impact still retains its integral structure and therefore is still serviceable. A restaurant tray molded from such a composition, for example, retains its strength and integral structure after it has been dropped many times. Each time the tray is dropped the energy of the impact is absorbed in the manner hereinbefore described so that the tray is not shattered.

The fact that a molding composition of the invention, which comprises a cellulose filler that has bonded thereto molecules each of which contains a monovalent hydrocarbon radical having not less than 8 carbon atoms and is impregnated with a polar thermosetting substance, is capable of being molded to produce articles that not only have satisfactory water resistance but also have superior impact strength has been demonstrated as follows:

A cellulose filler having bonded thereto molecules each of which contains a monovalent hydrocarbon radical having not less than 8 carbon atoms was prepared as follows: A cellulose filler (60 grams of fragments of a woven cotton fabric) was impregnated with an aqueous solution consisting of 1.2 grams of Zelan, i. e., octadecyloxymethyl pyridinium chloride, and 0.2 gram of sodium acetate in 120 grams of water ranging from about 90 to about 95° F. After drying the impregnated filler as quickly as possible at room temperature and baking it at 350° F. for approximately two to four minutes in an oven having good air circulation, the filler was washed thoroughly at temperatures of about 120 to 130° F. in a water solution containing 0.1 per cent of soda ash and 0.05 per cent of a wetting agent (butyl-1-naphthalenesulfonic acid). (The terms "per cent" and "parts," as used herein, mean per cent and parts by weight unless otherwise specified.) The coated cellulose filler was then dried at a temperature of approximately 250° F. for about ten minutes.

A compound of the invention, A, was prepared as follows: A solution of 1 mol of melamine in formalin (37 per cent aqueous formaldehyde solution) containing 3 mols of formaldehyde was held at 80° C. for ten minutes at a pH of 7. The resulting polar thermosetting substance was diluted with water to a solids concentration of about 50 per cent, and the mixture (200 parts) was used to impregnate the Zelan-coated filler (40 parts) prepared as described in the preceding paragraph. The impregnated material was thoroughly dried.

For the sake of comparison, a compound B (a control), was prepared by the procedure described in the preceding paragraph except that the filler used consisted of untreated fragments of the same woven fabric (40 parts).

Compositions A and B were compression molded for two minutes under a pressure of 17,000 pounds per square inch of projected area in a mold heated with steam at 75 pounds per square inch gauge pressure to obtain disks having a diameter of two inches. The disks so obtained were tested for impact strength, using test equipment that was essentially the same as the standard "Charpy" test apparatus by means of which an arbitrary gauge reading is obtained which represents the impact strength as the energy (foot-pounds) absorbed in an impact by which a molded article is broken. The energy absorbed in the impacts by which several of the two-inch diameter molded disks of compounds A and B were broken is given in column 2 of Table 1 (below).

The water resistance of a molded article is measured by the amount of water the article is capable of absorbing, because the degree of deterioration upon exposure to moisture varies with the amount of water absorbed. The water resistance of disks molded from compounds A and B was measured as follows: The disks were immersed in boiling water for one hour, and the water absorption was measured as the gain in weight (in grams) during immersion (Table 1). The disks tested for water resistance were molded for two minutes (column 3), three minutes (column 4) and four minutes (column 5) by the procedure hereinbefore described.

TABLE 1

| Compound | Impact Strength | Water Absorption (grams) | | |
|---|---|---|---|---|
| | | Two min. | Three min. | Four min. |
| A | 0.70 to 0.90 | 0.065 | 0.045 | 0.050 |
| B (control) | 0.38 to 0.45 | 0.060 | 0.045 | 0.045 |

As the results in Table 1 indicate, the impact strength of articles molded from a compound embodying the invention, A, is superior (by approximately 100 per cent) to that of articles molded from a compound, B, which is the same as the compound of the invention except that the cellulose filler used in its preparation was not treated with Zelan before impregnating it with the resin solution. Furthermore, as the results in Table 1 also indicate, articles molded from a compound of the invention have satisfactory water resistance as well as superior impact strength.

In the practice of the invention, a composition capable of being molded to produce articles of superior impact strength is produced by a method that comprises impregnating a cellulose filler, having bonded thereto molecules each of which contains a monovalent hydrocarbon radical having not less than 8 carbon atoms, with a polar thermosetting substance, the molecules bonded to the cellulose having the effect of reducing the strength of the bond between the polar thermosetting substance and the cellulose so as to increase the impact strength of articles molded from the composition.

*Coated cellulose filler*

For the sake of brevity, a cellulose filler having bonded thereto molecules each of which contains a monovalent hydrocarbon radical having not less than 8 carbon atoms is referred to herein as a "coated cellulose filler" and a substance whose molecules each contain a monovalent hydrocarbon radical having not less than 8 carbon atoms and are capable of being bonded to the cellulose filler is referred to herein as a "coating agent." A coated cellulose filler that may be employed in a thermosetting composition embodying the invention may be prepared from any form of cellulose. The cellulose fillers ordinarily used include alpha cellulose, shredded paper, chopped cloth (e. g., canvas), cotton flock, cotton linters, purified wood fibers in finely ground forms or in felted-fiber forms, lignin-enriched or acid-hydrolyzed lignified wood pulp, walnut shell flour, redwood fiber and cotton cord.

The preferred cellulose filler for use in the present invention is a rag filler (i. e., a filler consisting of fragments of a woven fabric such as chopped cotton cloth). When a rag filler is treated with a coating agent (as hereinafter described) and subsequently impregnated with a polar thermosetting substance by the method of the invention, the resulting composition can be molded into articles having exceptionally high impact strength.

A coated cellulose filler used in the practice of the invention may be either (1) a cellulose filler to which the molecules of a coating agent are attached by chemical bonds so that actually radicals derived from such molecules are present in the coated cellulose filler or (2) a cellulose filler to which the molecules of a coating agent are attached by physical bonds (i. e., essentially by adsorption) so that said molecules remain intact in the coated cellulose filler.

A coated cellulose filler (1), for example, may be prepared from one of the cellulose fillers hereinbefore described and a coating agent such as palmityl chloride. The chlorine atom in a molecule of the palmityl chloride reacts with an OH group in the cellulose, with the liberation of HCl and the formation of a

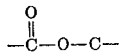

bond. Thus, a palmityl chloride molecule is chemically bonded to cellulose in a coated cellulose filler prepared from such a coating agent.

On the other hand, a coated cellulose filler (2) may be prepared from a coating agent such as a chromium complex, as hereinafter described. The molecules of such a complex do not react chemically with cellulose but become physically bonded to a cellulose filler by adsorption.

A monovalent hydrocarbon radical having not less than 8 carbon atoms in a molecule of a coating agent which may be used in the present method may be a monovalent aliphatic, cycloaliphatic, aryl, chloroaryl or aralkyl radical having from 8 to 24 carbon atoms. Ordinarily, in the practice of the invention the best results are obtained when the hydrocarbon radical has not less than 10 carbon atoms in the molecule of a coating agent, a hydrocarbon radical having 18 carbon atoms often being preferred.

A straight or branched chain monovalent aliphatic radical in the molecule of a coating agent may be a primary, secondary or tertiary alkyl radical having from 8 to 24 carbon atoms (i. e., a primary, secondary or tertiary octyl or (iso-octyl) radical, or any primary, secondary or tertiary alkyl radical having fom 9 to 24 carbon atoms), or a primary, secondary or tertiary alkenyl radical having from 8 to 24 carbon atoms, or a substituted aliphatic radical such as a mono-, di-, tri-, or tetra-chloro derivative of such an alkyl or alkenyl radical.

A monovalent cyclo aliphatic radical in the molecule of a coating agent may be a mono-, di- or tri-alkyl-substituted cyclopentyl, cyclohexyl, cyclopentenyl or cyclohexenyl radical, each alkyl substituent being a primary, secondary or tertiary alkyl radical having from 1 to 18 carbon atoms, the total number of carbon atoms in such monovalent radical being at least 8 and not more than 24, or a substituted monovalent cycloaliphatic radical which may be a mono-, di-, tri-, or tetrachloro derivative of such a radical. (For example, a monovalent cycloaliphatic radical may be a trimethylcyclopentyl, a di- or trimethylcyclohexyl, a di- or triethylcyclopentyl, a mono-, di- or triethylcyclohexyl, a mono- or di-propylcyclopentyl, a mono- or dipropylcyclohexyl, a 1-butyl-2-ethylcyclohexyl, an amylcyclohexyl, or a 1-chloro-4-propylcyclohexyl radical.)

A monovalent aryl or chloroaryl radical in the molecule of a coating agent may be a radical consisting of from one to three benzene nuclei (i. e., a radical of the benzene, naphthalene, anthracene, diphenyl or terphenyl series), having a total of at least 8 and not more than 24 nuclear and side chain carbon atoms, having not more than five side chains, and having no substituents or having from one to four chloro substituents. Any side chain on such a radical may be a monovalent or divalent aliphatic radical containing not more than 18 carbon atoms, the side chains which are closed having from 2 to 6 carbon atoms connected either to one nuclear carbon atom (e. g., cyclohexylphenyl) or two different nuclear carbon atoms (e. g., acenaphthyl). Such radicals include xylyl, ethylphenyl, mesityl, methylethylphenyls, n-propylphenyl, propylphenyl, isopropylphenyl, diethylphenyls, pentamethylphenyl, amylphenyls, butylmethylphenyls, propyldimethylphenyls, propylethylphenyls, ethyltrimethylphenyls, diethylmethylphenyls, hexylphenyl, cyclohexylphenyl, amylmethylphenyl, butylethylphenyl, butyldimethylphenyl, propylethylmethylphenyl, diphenyl, dipropylphenyls, naphthyl, 1-methylnaphthyl, 2-methylnaphthyl, 1-ethylnaphthyl, 2-ethylnaphthyl, phenyl-naphthyl, anthracyl, 9-methylanthracyl, 2,3-dimethylanthracyl, 2,4-dimethylanthracyl, 9-ethylanthracyl, dichloroxylyl, 2-chloronaphthyl, 2-chloro-1-methylnaphthyl, 9,10-dichloroanthracyl, phenanthryl, 3-methylphenanthryl, 1,4-dimethylphenanthryl, diphenyl and terphenyl radicals.

A monovalent aralkyl or chloroaralkyl radical in the molecule of a coating agent may be a radical consisting of a monovalent aliphatic or cycloaliphatic radical containing from 1 to 18 carbon atoms, in which a hydrogen atom has been replaced by a monovalent aryl or chloroaryl radical having from six to 23 carbon atoms, the aralkyl or chloroaralkyl radical having a total of not less than 8 and not more than 24 carbon atoms.

One type of coating agent used in the present method may be any substance each molecule of which contains a monovalent hydrocarbon radical having not less than 8 carbon atoms (as hereinbefore described) and is capable of becoming chemically bonded to a cellulose filler (i. e., by reacting with an alcoholic hydroxy group in a cellulose molecule). However, some compounds of this type do not give as good results as others when used as coating agents in actual practice because, under the conditions required for reaction with an alcoholic hydroxy group of cellulose, the molecules of some substances may undergo side reactions which tend to result in deterioration of the strength of the cellulose. For example, primary alkyl chlorides containing three or more carbon atoms are not preferred as coating agents, since in the preparation of coated cellulose fillers by reaction of a primary alkyl chloride with cellulose to form a cellulose ether the strong alkali and the relatively high temperatures which are necessary tend to cause saponification of the alkyl chloride and degradation of the cellulose.

Coating agents whose molecules may be chemically bonded to a cellulose filler, in the preparation of a coated cellulose filler which may be used in the present method, include halo-substituted ethers having the general formula $$X-CH_2-O-R$$

in which X is a halogen having an atomic weight between 35 and 80, i. e., chlorine or bromine (preferably chlorine), and R is a monovalent hydrocarbon radical having from 8 to 24 carbon atoms, as hereinbefore described. Such substituted ethers include chloromethyl octyl ether, chloromethyl decyl ether, chloromethyl lauryl ether, chloromethyl tetradecyl ether, chloromethyl cetyl ether, chloromethyl octadecyl ether, chloromethyl docosyl ether, chloromethyl 4-propylcyclohexyl ether, chloromethyl 1-methyl-3-(2,2,6-trimethyl cyclohexyl)propyl ether and chloromethyl 3-(2,2,6-trimethylcyclohexyl)-sec-butyl ether.

These and other halo-substituted ethers which may be used as coating agents are prepared by any of the known methods, for example, by passing HCl gas into a solution comprising the corresponding fatty alcohol and paraformaldehyde.

When a coated cellulose filler is prepared from a coating agent which is a halo-substituted ether, the reaction by which the molecules of the ether become chemically bonded to the cellulose filler may be carried out in the presence of pyridine. Not only does the pyridine act as a solvent during the reaction, but it also prevents the degeneration of cellulose which ordinarily occurs when the same reaction conditions are employed with no pyridine, and it aids in releasing the halogen atoms from the molecules of the substituted ether so that the molecules can become chemically bonded to the cellulose. For example, the reaction of cellulose with a halo-substituted ether (e. g., cetyl chloromethyl ether $C_{16}H_{33}-O-CH_2Cl$) in the presence of pyridine to form a coated cellulose filler (e. g., cetyl cellulose methylene ether) may be represented by Equation 1 below:

(1) 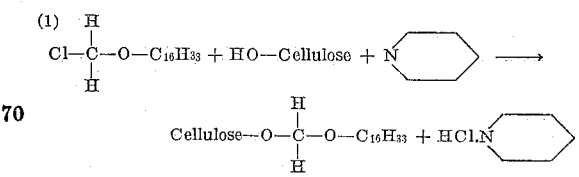

Lauryl cellulose methylene ether and octadecyl cellulose methylene ether are other examples of coated cellulose fillers which are obtained by similar reactions in the presence of pyridine.

It is believed that in the reaction represented by Equation 1 above, there is actually formed first an intermediate reaction product between the halo-substituted ether and the pyridine, and that this intermediate reaction product then reacts with the cellulose to yield the cellulose ether, pyridine and the hydrogen halide. Thus, a substituted ether in which the substituent consists of a pyridinium halide group instead of a halogen atom may be advantageously employed as a coating agent. For example, Zelan (octadecyloxymethyl pyridinium chloride),

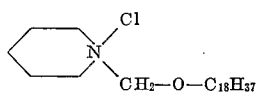

is a particularly useful coating agent for use in the practice of the invention. Zelan reacts with the hydroxy groups of a cellulose filler upon heating to release pyridine and HCl. Since HCl is objectionable as a by-product, sodium acetate is ordinarily added. The acetic acid and sodium chloride which are then obtained as by-products are relatively unobjectionable since the acetic acid is volatile and the sodium chloride can be washed out. The reaction of Zelan with cellulose in the presence of sodium acetate may be represented by Equation 2 below:

(2)
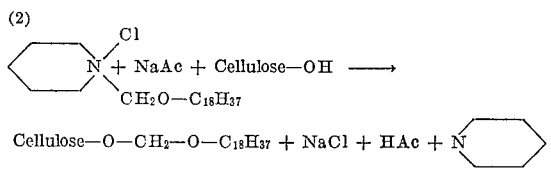

Another coating agent that may be bonded to cellulose to produce results similar to those obtained by the use of Zelan in the present method is a pyridinium compound of 6-(chloromethyl)-2-(octadecyloxymethyl)-4-chlorophenol.

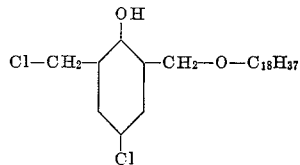

Coating agents whose molecules may be chemically bonded to a cellulose filler also include the anhydrides and chlorides of monocarboxylic acids having the general formula

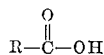

in which R is a monovalent (substituted or unsubstituted) hydrocarbon radical having from 8 to 24 carbon atoms. Such acids include straight, branched and closed chain aliphatic and cycloaliphatic monocarboxylic acids having from 9 to 25 carbon atoms (e. g., saturated fatty acids in the series from pelargonic to hyenic; unsaturated fatty acids such as nonenoic, decenoic, palmitoleic, oleic, elaidic, brassidic and erucic acids; α,α-dichloro capric, methyl-cyclopentanepropionic, cyclopentanebutyric, α-ethylcyclohexaneacetic, cyclohexanepropionic, and cyclohexanehendecanoic acids); aryl-substituted aliphatic and cycloaliphatic monocarboxylic acids having from 9 to 25 carbon atoms (e. g., α or β-phenylpropionic, phenylangelic, 1- or 2-naphthaleneacetic, α-butyl-1-naphthaleneacetic, β-chloro-2-naphthaleneacrylic, 1- or 2-naphthalenebutyric, 2-naphthalenepelargonic, 1-phenanthreneacetic and 9-anthracenebutyric acids); and aromatic or alkyl-substituted aromatic monocarboxylic acids having from 9 to 25 carbon atoms (e. g., p-butylbenzoic, 3,5-diethylbenzoic, 2,4,6-triethylbenzoic, 7-ethyl-1-naphthoic, 5,8-dichloro-2-naphthoic, 1-anthroic, 5-chloro-2-biphenylcarboxylic and 1-phenanthrenecarboxylic acids).

When a coated cellulose filler is prepared from a coating agent which is a chloride of one of the acids hereinbefore described, the reaction by which the molecules of the acid chloride (e. g., stearyl chloride) become chemically bonded to the cellulose filler may be represented by Equation 3 below:

(3)
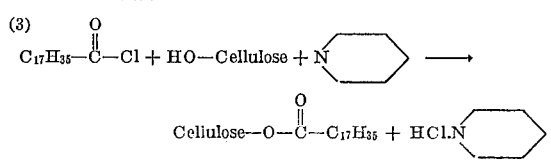

The presence of pyridine in the above reaction is usually desirable (as hereinbefore discussed).

Acid anhydrides in the presence of tertiary organic bases such as pyridine do not react with cellulose as readily as acid chlorides. In the presence of pyridine hydrochloride, however, a much stronger reaction takes place, probably due to the formation of anacid chloride.

Coated cellulose fillers prepared from coating agents that are acid chlorides or anhydrides include cellulose pelargonate, cellulose caprate, cellulose laurate, cellulose myristate, cellulose palmitate, cellulose undecylenate and cellulose oleate.

Coating agents which are useful in the practice of the invention include not only the chlorides and anhydrides of the acids hereinbefore described, but also methyl pyridinium halide esters of such acids having the general formula

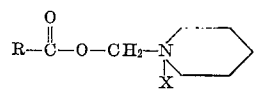

in which R is a monivalent hydrocarbon radical having from 8 to 24 carbon atoms and X is a chlorine or bromine atom.

Other coating agents whose molecules may be chemically bonded to cellulose are acid chlorides of half esters of dicarboxylic acids containing a monovalent hydrocarbon radical having at least 8 carbon atoms, i. e., substances that may be considered to be derived by replacing one of the chlorine atoms in a molecule of a dicarboxylic acid chloride such as oxalyl chloride, succinyl chloride, or phthalyl chloride with, for example, an alkoxy (or cycloalkoxy) radical containing at least 8 carbon atoms. Coated cellulose fillers that are prepared from such coating agents include cellulose menthyl oxalate and cellulose cetyl oxalate.

Not only do the acid chlorides and anhydrides of the aliphatic and cycloaliphatic monocarboxylic acids hereinbefore described act as coating agents, but the acid themselves may be used to esterify cellulose if a substituted anhydride which does not react with cellulose (e. g., an anhydride of a halo- or alkoxy-substituted acetic acid, usually monochloroacetic anhydride) is employed as an impelling agent to bring about reaction. For example, a coated cellulose filler may be prepared by mixing cellulose (1 part) with 5 parts of chloroacetic anhydride, 0.2 part of magnesium perchlorate as a catalyst, and slightly more than the calculated amount of the acid required to produce the desired degree of esterification, and heating the mixture at a temperature of approximately 60 to 70 degrees C.

Coating agents whose molecules may be chemically bonded to cellulose may be isocyanates (or isothiocyanates) having the general formula

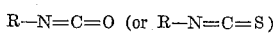

in which R is a monovalent hydrocarbon radical having from 8 to 24 carbon atoms. Such coating agents include stearyl isocyanate, octadecyl isothiocyanate, 2-naphthyl isocyanate, 1,1-dimethylheptyl isocyanate, hendecyl isocyanate, 1-naphthylmethyl isothiocyanate and 1-naphthyl isothiocyanate. The reaction by which molecules of such coating agents become chemically bonded to a cellulose filler may be represented by Equation 4 below:

(4)
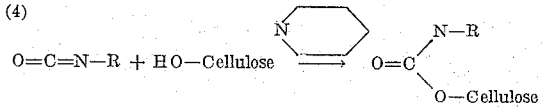

Cellulose esters of octadecyl isothiocyanate and stearyl isocyanate are examples of coated cellulose fillers which may be obtained by such a reaction.

A coating agent whose molecules may be chemically bonded to cellulose may be a hydrochloride or a methylol derivative of (1) an alkyl- (or cycloalkyl) substituted urea in which the alkyl substituent has from 8 to 24 carbon atoms (e. g., menthyl urea, tetradecyl urea, hexadecyl urea and octadecyl urea), (2) an acyl derivative of urea (a ureide) in which the acyl radical contains a monovalent hydrocarbon radical having from 8 to 24 carbon atoms (e. g., capryl urea, eicosanoyl urea and erucyl urea), and (3) a guanamine whose molecule contains a monovalent hydrocarbon radical having from 8 to 24 carbon atoms (e. g., lauro guanamine and stearo guanamine). The methylol derivatives of such substances may be obtained by heating the substances with an aqueous formaldehyde solution by the procedure hereinafter described, and allowing the reaction to proceed to the stage at which the reaction ingredients have just dissolved. The reaction of a methylol derivative of an alkyl-substituted urea (e. g., octadecyl urea) with cellulose may be illustrated by Equation 5 below:

(5)
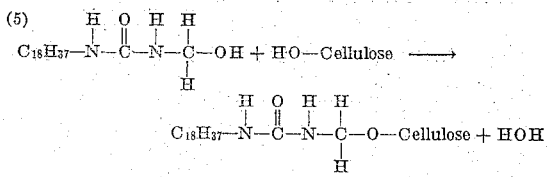

A coating agent whose molecules may be physically bonded to cellulose (e. g., by adsorption) may be a substance that is a chromium complex compound of a monocarboxylic acid containing a hydrocarbon radical having not less than 8 carbon atoms (e. g., chromium complexes of stearic, abietic and naphthoic acids). It is believed that chromium atoms in such a chromium complex compound exert an auxiliary valence in addition to the principal valences (which occur in simple chromium compounds) so that the total valence of a nuclear chromium atom is six, and six groups may be coordinated with a nuclear chromium atom in a chromium complex compound.

A chromium complex compound, the molecules of which may be bonded to cellulose to produce a coated filler for use in the present invention, may be prepared by any of the known methods. For example, the chromium complex may be derived from a trivalent chromium salt such as chromium chloride hexahydrate ($CrCl_3 \cdot 6H_2O$). A basic chromium chloride hexahydrate (i. e., a chromium chloride hexahydrate in which some of the chlorine atoms have been replaced by OH groups) that may be used in the preparation of a complex may be a compound which is less than 50 per cent basic (i. e., a chromium chloride hexahydrate in which less than one and one-half chlorine atoms per molecule have been replaced by OH groups (e. g., $Cr(OH)Cl_2 \cdot 6H_2O$). Thus, a basic trivalent chromium salt (e. g., a basic chromium chloride hexahydrate) may be reacted with an acid such as naphthoic acid to obtain a water-soluble chromium complex of the acid, which may be applied to a cellulose filler for use in the practice of the invention.

Any of the procedures known in the art of preparing cellulose ethers, esters, etc., may be employed in the preparation of a coated cellulose filler for use in the present method, but the degree to which the cellulose is reacted with one of the coating agents hereinbefore described in bonding the molecules of the coating agent to the cellulose should be controlled so that complete esterification, etherification, etc., does not take place. In fact, it is desirable that there be merely a surface reaction, whereby the cellulose fibers are coated with the coating agent but the fibrous structure of the cellulose filler is not destroyed. Ordinarily, the cellulose filler is impregnated with an aqueous solution or an organic solvent solution of the coating agent at a slightly elevated temperature, the solvent is removed, and the coating agent is cured on the filler by maintaining the material at an elevated temperature for a very short period. In general, the minimum proportion of coating agent used is that which imparts a noticeable improvement in the impact strength of articles molded from compositions produced in accordance with the present method (e. g., about .01 per cent of the coated filler). Although the impact strength can be further increased by increasing the proportion of coating agents, above a certain maximum proportion, which varies for each coating agent, the improvement in impact strength which can be obtained is not increased enough to make a larger proportion of coating agent economical for most applications. Furthermore, the proportion of coating agent should not be so large as to form a waxy film over the filler, for such a film tends to make impregnation of the filler with a solution of a polar thermosetting substance difficult. The preferred proportion of coating agent in a coated cellulose filler used in the present method (and the conditions under which the filler is treated with the coating agent) varies in accordance with the particular type of coating agent and the particular form of cellulose employed.

For example, when the coating agent in the preparation of a coated cellulose filler for use in the present method is Zelan, and the filler comprises fragments of a woven cotton fabric, the filler may be impregnated with a water solution comprising the Zelan and an amount of sodium acetate equal to 16.7 per cent of the weight of the Zelan, at a temperature ranging from about 90 to about 95° F. The concentration of Zelan in the water solution should be such that the amount of coating material added to the cellulose is at least about 2 per cent and not more than about 10 per cent of the final coated filler. (When the filler is alpha cellulose, the proportion of such coating material in the final coated filler may also be about 2 per cent.) The impregnated cellulose is dried as quickly as possible at room temperature, and the Zelan coating is cured on the filler by heating for about two to four minutes in an oven, having good air circulation, at a temperature of about 350° F. The treated filler is then washed thoroughly with an aqueous solution comprising 0.1 per cent of soda ash and 0.05 per cent of a wetting agent (e. g., a butylnaphthalenesulfonic acid) at temperatures ranging from about 120 to about 130° F. The coated filler is then dried at a temperature of about 200° F. for about fifteen minutes or at a temperature of aobut 250° F. for about ten minutes.

Although a coating agent such as Zelan may be used in aqueous solution to treat a cellulose filler in the present method, other coating agents such as halo-substituted ethers, acid chlorides, acid anhydrides, isocyanates and isothiocyanates are often employed in an organic solvent solution. For example, when the coating agent is an isocyanate, a rag filler may be treated with a solution of the isocyanate in carbon tetrachloride (e. g., cotton twill may be impregnated with a solution comprising 10 grams of stearyl isocyanate per liter of carbon tetrachloride, and the treated cloth may then be hydroextracted, and dried at a temperature of about 212° F. for about one hour).

In some cases the coating agents are reacted with cellulose in the presence of a tertiary organic base, usually pyridine, and an organic substance such as benzene, toluene, chlorobenze, nitrobenzene or carbon tetrachloride which acts as a diluent for the pyridine-coating agent reaction mixture is often employed. At higher temperatures such a diluent acts as a solvent for the intermediate reaction product which is believed to form between the coating agent and the pyridine before the coating agent reacts with cellulose.

*Polar thermosetting substance*

In the production by the present method of compositions embodying the invention which are capable of being molded to produce articles of superior impact strength, a coated cellulose filler, as hereinbefore described, is impregnated with a polar thermosetting substance. Polar thermosetting substances which may be used in the practice of the invention include heat-hardenable phenolic resins, polymerizable unsaturated polyesters (i. e., polymerizable unsaturated polyhydric alcohol-polycarboxylic acid polyesters) and resinous reaction products of formaldehyde with a substance whose molecule has a plurality of $NH_2$ groups each connected to a carbon atom which in turn is connected by a double bond to an atom having an atomic weight from 14 to 16 (i. e., oxygen or nitrogen).

Polar thermosetting substances used in the present method that are heat-hardenable phenol-formaldehyde resins include the resinous products of condensation reactions of one mol of phenol (or a cresol) with slightly more than one mol of formaldehyde in the presence of a basic catalyst. (Acid-catalyzed phenol-formaldehyde reactions ordinarily yield compositions which are thermoplastic.)

A polar thermosetting substance used in the present method that is a polymerizable unsaturated polyester is prepared by reaction of one or more polyhydric alcohols and one or more polybasic acids. The proportion of polyhydric alcohols having more than two hydroxy groups, such as glycerol or pentaerythritol, and the proportion of polycarboxylic acids having more than two carboxy groups, such as citric acid, preferably is small so that in the production of the polyester there may be maximum esterification of the hydroxy and carboxy groups without attainment of excessive viscosity (i. e., through cross-linking). Ordinarily it is desirable that the unsaturated polyester be polymerizable into an infusible or high melting point resin, so that the proportion of unsaturated components should be such that the polyester contains an average of more than one double bond per molecule (for example, there may be an average of eleven or more double bonds in every ten molecules of the polyester); and for the purposes of the instant invention it is to be understood that the term "unsaturated polyester" means a polyester that is polymerizable into an infusible or high melting point resin.

The present invention is applicable to all polymerizable unsaturated polyhydric alcohol-polycarboxylic acid polyesters. A typical example of such a polyester is a product prepared by the reaction of an unsaturated dicarboxylic acid such as maleic, fumaric, itaconic, citraconic or mesaconic acid with a dihydric alcohol such as any polymethylene glycol in the series from ethylene glycol to decamethylene glycol, propylene glycol, any butylene glycol, any poylethylene glycol in the series from diethylene glycol to nonaethylene glycol, dipropylene glycol, any glycerol monobasic acid monoester (in either the alpha or beta position), such as monoformin or monoacetin, any monoether or glycerol with a monohydric alcohol, such as monomethylin or monoethylin, or any dihydroxy alkane in which the hydroxy radicals are attached to carbon atoms that are primary or secondary or both, in the series from dihydroxy butane to dihydroxy decane.

Part of the unsaturated dicarboxylic acid may be replaced by a saturated dicarboxylic acid, such as any normal acid in the series from oxalic acid and malonic acid to sebacic acid, or any benzene dicarboxylic, naphthalene dicarboxylic or cylohexane dicarboxylic acid, or diglycolic, dilactic or resorcinol diacetic acid. All of the unsaturated acid may be replaced by a saturated acid if a polyhydric alcohol is present whose molecule has two or three free hydroxy groups and consists of an ether of one or two molecules of allyl or methallyl alcohol with one molecule of a polyhydroxy compound such as glycerol, pentagycerol, pentaerythritol, butantetrol-1,2,3,4, a trihydroxy normal alkane having from four to five carbon atoms such as butantriol-1,2,3 or a monoalkyl ether of pentaerythritol or butantetrol-1,2,3,4 in which the alkyl radical has from one to four carbon atoms and has from one to two hydrogen atoms attached to the same carbon atom as the ether linkage, such as the monomethyl or monoisobutyl ether of pentaerythritol.

In the practice of the invention the preferred polymerizable unsaturated polyhydric alcohol-polycarboxylic acid polyesters are the so-called "linear" polyesters, i. e., those which have very little cross-linking in the polyester molecules, as evidenced by the fact that such polyesters are soluble in solvents such as actone. Such polyesters are formed mainly by esterification of a dihydric alcohol and a dibasic acid. Of course, such polyesters are really only "substantially" linear since it is not possible to avoid all cross-linking, at least through the unsaturated bonds in the polyester molecules. In fact, a linear (or substantially linear) polyester may be obtained even though in the preparation of such polyester a small proportion of the dihydric alcohol (e. g., less than about 5 mol per cent of the alcohol) is replaced by a polyhydric alcohol containing more than two alcohol radicals, such as glycerol or pentaerythritol, or a small proportion of the dibasic acid (e. g., less than about 5 mol per cent of the acid) is replaced by a polybasic acid containing more than two acid radicals, such as citric acid. The preferred linear polyester for use in the practice of the invention is prepared by carrying out the esterification reaction substantially to completion (i. e., to an acid number of less than about 40) without permitting substantial (addition) polymerization to take place. Although the esterification reaction is usually carried out under an inert gas atmosphere so as to exclude oxygen, various inhibitors may be used to prevent appreciable polymerization of the polyester during the esterification reaction.

In the preparation of the polymerizable unsaturated polyester, any of the usual modifiers such as monobasic acids, monohydric alcohols and natural resin acids may be added. The larger the proportions of monobasic acids and monohydric alcohols, the lower is the average number of acid and alcohol residues in the resulting polyester molecules, and the lower is the viscosity of the polyester. On the other hand, the more nearly equal the molecular proportions of dibasic acid and dihydric alcohol, the greater is the average number of residues in the resulting polyester molecules, and the greater is the viscosity. The proportions of ingredients used are those proportions that produce a polymerizable polyester of the desired viscosity. Other properties of the polyester, such as solubility in various solvents, also may be varied by selecting various reacting ingredients and varying their proportions. The infusibility, hardness and inertness of the product obtained by polymerization of the polyester may be increased by varying the initial reacting ingredients to increase the average number of double bonds per molecule of the polymerizable polyester.

The point to which the reaction of the ingredients is carried in the preparation of the polymerizable polyester is simply that point at which the product has the desired consistency. The consistency or viscosity of the polyester (prepared by reaction under conditions which prevent any appreciable addition polymerization) varies directly with the average number of acid and alcohol residues in the molecule. For example, the average number of residues in the molecule of the polyester may vary from about three to about one hundred twenty.

If desired, the reaction may be expedited by use of an acid substance as a catalyst. Any organic acid, inorganic acid or acid salt that is soluble in the reaction mixture may be employed as a catalyst, but it is desirable that any acid substance used be readily volatile or be of such a character that it has no deleterious effect in the final product. The amount of acid catalyst employed is simply that amount which accelerates the esterification to the desired degree.

The reaction is carried out at a temperature high enough and for a time long enough to secure the desired consistency. An elevated temperature preferably is employed to expedite the reaction, but during the preparation of the polyester, the temperature should not be so high nor the time of reaction so long as to cause substantial polymerization. There is less danger of premature polymerization if an inhibiting agent is added before the esterification is carried out.

Whenever added, an inhibiting agent is used in the proportion required to give the desired degree of inhibiting effect. It may be necessary to use different inhibitors in widely different proportions in order to secure the same inhibiting effect.

Any desired anti-oxidant such as hydroquinone, pyrogallol, tannic acid or any aromatic amine, such as aniline or phenylene diamine may be employed as an inhibitor.

The preparation of the unsaturated polyester preferably is carried out in an atmosphere of an inert gas such as carbon dioxide, nitrogen or the like, in order to prevent cross-linking through addition polymerization as well as to prevent darkening or to make it possible to obtain a pale or colorless product. Bubbling the inert gas through the reacting ingredients is advantageous in that the gas serves the added functions of agitation and of expediting the removal of water formed by the reaction. Exclusion of oxygen is desirable not only because it causes discoloration, but also because it tends to produce premature polymerization at the elevated temperatures used.

The acid number of the product depends upon the degree of reaction and the proportions of acid and alcohol used for the reaction. With equimolecular proportions of dibasic acid and dihydric alcohol, the reaction may be carried to an acid number of about 20. The use of an acid catalyst may make it possible to attain a lower acid number without substantial polymerization.

Polymerization of these materials usually is carried out at temperatures of about 180° to about 210° F. A solution comprising one or more polymerizable unsaturated polyesters and one or more polymerizable monomeric compounds is particularly useful as a binder in the production of molding compositions of the invention. Either the unsaturated polyester or the monomeric compound or both may be partially polymerized before the ingredients are mixed. Polymerizable monomeric compounds that are useful for the preparation of such a solution include the polyallyl monomeric esters, examples of which include diallyl phthalate, diallyloxalate, diallyl diglycolate, triallyl citrate, carbonyl bis-(allyl lactate), maleyl bis-(allyl lactate), fumaryl bis-(allyl lactate), succinyl bis-(allyl lactate), adipyl bis-(allyl lactate), sebacyl bis-(allyl lactate), phthalyl bis-(allyl lactate), fumaryl bis-(allyl glycolate), carbonyl bis-(allyl glycolate), carbonyl bis-(allyl salicylate), tetra-(allyl glycolate) silicate, and tetra-(allyl lactate) silicate.

A polar thermosetting substance that is a resinous reaction product of formaldehyde with a substance whose molecule has a plurality of $NH_2$ groups each connected to a carbon atom which in turn is connected by a double bond to an atom having an atomic weight from 14 to 16 (i. e., oxygen or nitrogen) is particularly useful in the present method. A substance whose molecule has a plurality of $NH_2$ groups each connected to a carbon atom which in turn is connected by a double bond to a nitrogen or oxygen atom may be (1) a substance whose molecule has a plurality of $NH_2$ groups, each attached to a carbon atom contained in a linear chain, which in turn is connected by a double bond to a nitrogen or oxygen atom, or (2) a substance whose molecule has a plurality of $NH_2$ groups, each attached to a carbon atom contained in a ring, which in turn is connected by a double bond to a nitrogen or oxygen atom.

A substance (1) which reacts with formaldehyde to form a resinous reaction product that can be used to impregnate a coated cellulose filler in accordance with the present method may be (a) a substance in which each carbon atom that is connected to $NH_2$ groups is connected by a double bond to an oxygen atom, e. g., urea,

biuret,

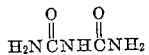

a polyamide such as tartramide,

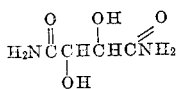

maleamide,

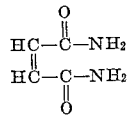

or phenyliminodiacetamide

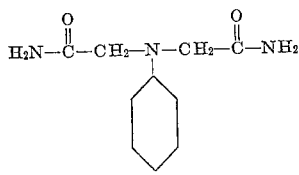

a diureido alkane, e. g., ethylene diurea,

or 1,2-propylene diurea,

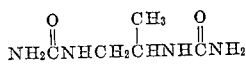

or crotonylidene diurea,

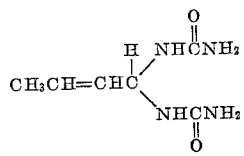

a di-ureidoalkyl ether such as beta, beta'-di-ureidoethyl ether,

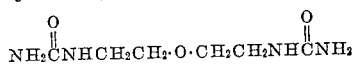

or gamma, gamma'-di-ureidopropyl ether,

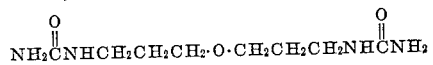

a di-ureidoalkyl polyether such as triethylene glycol diurea,

an aliphatic polyamide having urea-end groups; a mono- or polyhydroxy derivative of any of the above-mentioned aliphatic di-ureido compounds in which each hydroxy group is attached to a carbon atom to which no urea group is attached, such as 2-hydroxy trimethylene diurea,

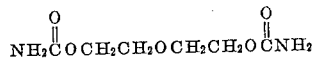

a diurethane such as diethylene glycol dicarbamate,

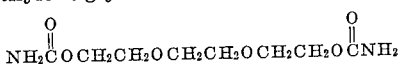

or triethylene glycol dicarbamate,

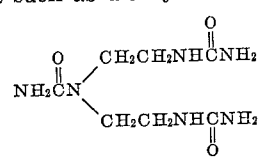

or a triurea such as diethylene triurea

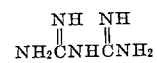

or (b) a substance in which there is not more than one $NH_2$ group connected to each carbon atom which in turn is connected by a double bond to a nitrogen atom, e. g., biguanide,

or dicyandiamidine,

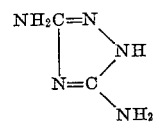

A substance (2) which reacts with formaldehyde to form a resinous reaction product that can be used in the present method may be (a) a substance whose molecule has a plurality of $NH_2$ groups each attached to a triazole ring, such as guanazole,

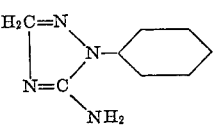

1-phenyl guanazole

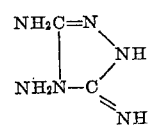

4-aminoguanazole

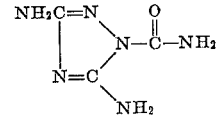

1-carbamyl guanazole

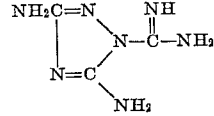

1-guanyl guanazole 1-acetyl guanazole

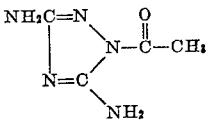

or 1-benzoyl guanazole

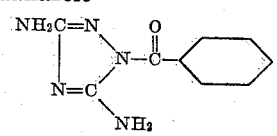

(b) a substance whose molecule contains a plurality of NH₂ groups each attached to a diazine ring, e. g., a pyrimidine such as 2,4-diamino-6-hydroxy pyrimidine,

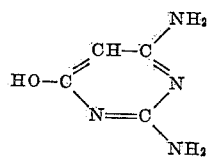

or a quinazoline such as 2,4-diaminoquinazoline,

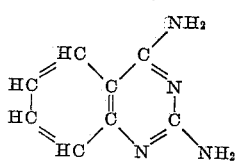

or (c) a substance whose molecule contains a plurality of NH₂ groups each attached to a triazine ring, e. g., a diamino triazine (i. e., a guanamine) such as acetoguanamine,

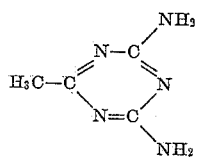

benzoguanamine,

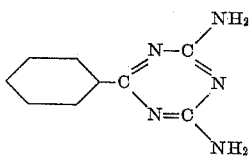

or formoguanamine

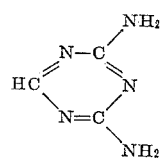

triamino triazine (i. e., melamine),

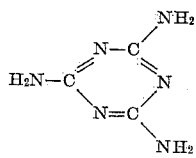

or a diguanamine, such as gamma-methyl-gamma-acetyl pimeloguanamine,

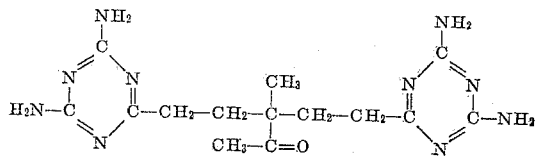

sebacoguanamine,

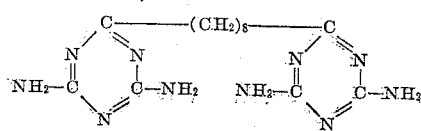

adipoguanamine,

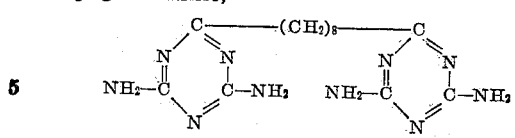

bis-(4,6-diamino-2-triazinyl-ethyl) fluorene,

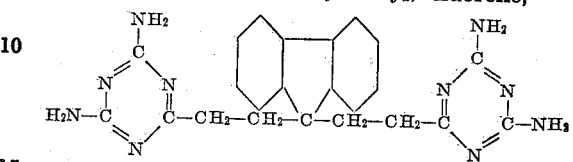

gamma-isopropenyl-gamma - acetyl pimeloguanamine,

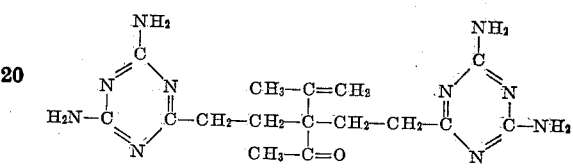

sym.-diphenyladipoguanamine,

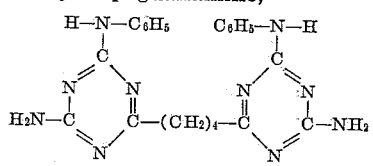

sym. - diphenylsebacoguanamine, sym. - di - p - phenetyladipoguanamine, or sym.-di-o-tolyladipoguanamine.

The first five diguanamines hereinbefore mentioned may be considered to be derivatives of dicarboxylic acids. Such diguanamines, as well as other diguanamines in which the exocyclic nitrogen atoms are unsubstituted may be produced by condensing with dicyandiamide the dinitrile corresponding to a dicarboxylic acid such as any normal aliphatic dicarboxylic acid in the series from malonic acid to octadecane 1,18-dicarboxylic acid, or fumaric acid, or any benzene dicarboxylic acid, or any naphthalene dicarboxylic acid, or any cyclohexane dicarboxylic acid, or the dimer of linoleic acid. The condensation of the dinitrile with dicyandiamide is carried out by dissolving a strongly basic catalyst in a suitable primary or secondary alcoholic solvent such as benzyl alcohol or ethylene glycol mono-methyl ether, adding the dinitrile and from about 2.2 to about 2.6 mols of dicyandiamide for each mol of the dinitrile, and heating to start the reaction. The reaction is then continued by heating or cooling if necessary to keep the temperature between about 100° and about 180° C. and to prevent the reaction from becoming too violent. The quantity of the alcoholic solvent used should be just sufficient to form a suspension of the precipitate that can be stirred during the reaction. When precipitation of the diguanamine is complete, the precipitate is filtered off and washed with boiling water to remove excess dicyandiamide and products of side reactions. The diguanamine may be purified by converting it to a hydrochloride and neutralizing an aqueous solution of the hydrochloride to liberate the diguanamide.

This method of preparation is versatile in that a large variety of dinitriles may be used for the reaction with dicyandiamide, to give a wide variety of diguanamines.

The dinitriles may be prepared by various methods. Dinitriles in which the cyano groups are separated by five carbon atoms in series, and in which the central carbon atom of the series is disubstituted, may be prepared by condensing acrylonitrile and a compound having an active methylene group, in the presence of a strong base. Other dinitriles may be prepared by reacting a polymethylene dihalide with sodium cyanide. Often it is convenient to prepare the dinitrile by dehydration of the diamide or directly from the dicarboxylic acid.

Diguanamines in which one or two of the exocyclic nitrogen atoms are substituted, as, for example, the last four diguanamines hereinbefore mentioned, may be prepared by various methods. One method consists in reacting 1-phenyl biguanide, 1-o-tolyl biguanide, 1-m-tolyl biguanide, 1-p-tolyl biguanide, 1-(2,5-dimethyl phenyl) biguanide, 1-methyl-1-phenyl biguanide, 1-p-phenetyl biguanide or 1-ethyl-1-phenyl biguanide with sodium carbonate, and adipyl chloride or the dichloride of any other dicarboxylic acid in chlorobenzene. Another method consists in reacting any of the aforementioned aryl or alkyl aryl biguanides, or 1-methyl biguanide, 1-ethyl biguanide, 1-propyl biguanide, 1-butyl biguanide, 1-allyl biguanide, 1-crotyl biguanide, 1,1-dimethyl biguanide, 1,1-diethyl biguanide or 1,1-diallyl biguanide, with the diethyl or dimethyl ester of adipic acid or any other dicarboxylic acid in the presence of an alkoxide catalyst. Still another method consists in reacting an aryl dicyandiamide such as phenyl dicyandiamide with adiponitrile or the dinitrile of any other dicarboxylic acid.

A polar thermosetting resinous reaction product may be obtained by reacting a substance whose molecule has a plurality of $NH_2$ groups each connected to a carbon atom which in turn is connected by a double bond to a nitrogen or oxygen atom, as hereinbefore defined (or a mixture of such substances), either with formaldehyde or with a polymer thereof, such as paraformaldehyde. When used for this reaction, paraformaldehyde is considered to split up so that the substance actually taking part in the reaction is formaldehyde. The substance whose molecule has a plurality of $NH_2$ groups each connected to a carbon atom which in turn is connected by a double bond to a nitrogen or oxygen atom (for the sake of brevity such a substance is hereinafter referred to simply as "a substance whose molecule contains a plurality of $NH_2$ groups") may be reacted with a solution of formaldehyde in water, in an organic solvent such as an alcohol, or in a liquid containing both water and an organic solvent. The reaction may be performed in an autoclave, if desired, to secure a reaction temperature above the boiling point of the solvent. Such a substance may be added to an ordinary commercial aqueous formaldehyde solution having a pH of 4, or to such a solution which has been made less acid, or neutral, or alkaline, preferably at a pH between 6 and 8, by addition of any desired base, such as sodium hydroxide, ammonium hydroxide, borax, or triethanolamine.

In general, the proportion of formaldehyde actually reacting may range from one-half to a maximum of two molecules for each $NH_2$ group. (An excess of formaldehyde above this maximum may be used for the reaction if desired, although an uncombinable excess of one of the reactants usually is not desirable in the final product.) Because of the complexity of the molecules of the reaction products that are produced, the proportion of formaldehyde actually reacting may vary freely between the limits stated. The preferred proportions vary, of course, with the specific substance that is reacted with formaldehyde. For example, when the substance is urea, the preferred proportions are about 3 mols of formaldehyde for every 2 mols of urea, and when the substance is melamine, the preferred proportions are about 3 mols of formaldehyde for each mol of melamine. Other examples of preferred molar ratios of formaldehyde to substances hereinbefore described, in the resinous reaction products that may be the polar thermosetting substance in a molding composition of the invention, are 2:1 for guanazole or 1-carbamyl guanazole, 2:1 for ethylene diurea or propylene diurea, 2.5:1 for diethylene glycol dicarbamate, 4:1 for 2,4-diamino-6-hydroxy pyrimidine, 3:1 for 2,4-diamino quinazoline, 2:1 for formoguanamine, acetoguanamine or benzoguanamine and 5:1 for adipoguanamine or sebacoguanamine.

The reaction in aqueous solution may proceed at normal temperatures, but heating ordinarily is desirable to shorten the time of reaction (e. g., at a temperature of about 30° C. for about six hours), or, in some cases, to dissolve the substances to be reacted with formaldehyde. A resin solution may be obtained by carrying the reaction only to its earliest stage, for example, the stage at which the reacting ingredients have just dissolved to form a solution, or by carrying the reaction to any further stage (short of the insoluble stage). By advancing the reaction, it is possible to obtain thermosetting resinous reaction products that are insoluble but still fusible. Such reaction products may be converted by heat into infusible resins.

An acid-reacting catalyst may be used in hardening or converting a thermosetting resinous reaction product in a molding composition of the invention into an infusible resin in the production of a molded article. Since the action of such a catalyst is due solely by its acidity, any acid substance, such as an inorganic acid, an organic acid or an acid salt such as ammonium chloride or sulfate, may be used as the catalyst. The degree of acidity employed during the hardening of the resinous reaction product is simply that acidity which causes the resinous reaction product to harden at the desired rate, and all such acid-reacting catalysts are used in the usual catalytic amounts, i. e., from about 0.1 to about 5 per cent by weight of the composition, and usually about 1 to 2 per cent by weight of the composition.

The molecules of the coating agent bonded to a cellulose filler in a molding composition of the invention functions to reduce the strength of the bond between the polar thermosetting substance (which acts as a binder in the composition) and the cellulose filler, so as to increase the impact strength of articles molded from the composition. When the polar thermosetting substance in a molding composition embodying the invention is a substance whose molecule contains a plurality of $NH_2$ groups, the coating agent molecules bonded to the cellulose filler in the composition perform an additional function which they do not perform in compositions of the invention in which the polar thermosetting substance is a polymerizable unsaturated polyester or a phenolic resin. Ordinarily when a conventional cellulose filler is impregnated with an aqueous solution of a resinous reaction product of formaldehyde with a substance whose molecule contains a plurality of $NH_2$ groups, the cellulose fibers are embrittled because of the complete impregnation of the fibers by the resin solution. However, in the known molding compositions, that are prepared from other polar thermosetting substances (e. g., thermosetting phenolic resins and polymerizable unsaturated polyesters) the impregnation usually is not carried out in an aqueous solution, and also the impregnation does not cause embrittlement of the cellulose fibers.

The novel additional function of a coating agent that is bonded to a cellulose filler in a molding compound embodying the invention prepared from a resinous reaction product of formaldehyde with a substance whose molecule contains a plurality of $NH_2$ groups, is the control of the degree or "depth" of impregnation of the cellulose fibers. In the practice of the invention control of the degree of impregnation of the coated filler by an aqueous solution of the resinous reaction product of formaldehyde with a substance whose molecule contains a plurality of $NH_2$ groups is possible by reason of the water repellency of a cellulose filler having bonded thereto molecules containing a hydrocarbon radical having not less than 8 carbon atoms, so that the embrittlement which occurs in molding compositions prepared from an ordinary, uncoated cellulose filler impregnated with an aqueous solution of a resinous product of formaldehyde with a substance whose molecule contains a plurality of $NH_2$ groups is avoided and a composition having high impact strength is obtained. For example, a composition of the invention prepared by impregnating a coated cellulose filler with an aqueous solution of a resinous reaction product of formaldehyde with melamine may be molded to produce articles which show a significant improvement in the following properties over articles molded from a composition that is the same except that it is made from an ordinary, uncoated cellulose filler: (1) resistance to cracking after immersion for one hour in boiling water and subsequent baking for one hour at a temperature of 180° F.; (2) resistance to cracking upon curing in a mold under pressure over long periods (e. g., under a pressure of 17,000 pounds per square inch of projected area in a mold heated with steam at 75 pounds per square inch gauge pressure for 45 minutes); and (3) flexibility while hot in the mold.

Thus, the method of the invention is particularly advantageous in the production of molding compositions from a polar thermosetting substance that is a resinous reaction product of formaldehyde and a substance whose molecule contains a plurality of $NH_2$ groups, and the resulting molding compositions are the preferred products of the invention. Furthermore, since articles obtained from compositions of the invention to which the cellulose filler comprises fragments of a woven fabric (i. e., a rag filler) have especially high impact strength, and since the yellowish color which some of the coating agents, e. g., Zelan, impart to molding compositions of the invention is barely perceptible in rag-filled compositions of the invention the most desirable compositions embodying the invention comprise a coated rag filler impregnated with a thermosetting reaction product of formaldehyde and a substance whose molecule has a plurality of $NH_2$ groups.

In general, the proportion of coated cellulose filler used in the practice of the invention may range from the minimum amount capable of appreciably improving the physical properties of the hardened product (i. e., about 5 per cent of the composition) to the maximum proportion which may be held together satisfactorily by the binder (i. e., polar thermosetting substance) in the hardened product (i. e., about 50 per cent of the composition). The proportion of polar thermosetting substance may range from about 50 to about 95 per cent of the composition. Of course, the proportion of coated cellulose filler used with a specific thermosetting substance varies with the properties of the thermosetting substance and with the properties of the coated filler. For example, in compositions comprising a thermosetting phenolic resin or a resinous reaction product of formaldehyde with a substance whose molecule has a plurality of $NH_2$ groups, as hereinbefore described, the maximum proportion of the coated cellulose filler is about 35 per cent of the composition, the minimum proportion is about 20 per cent of the composition, and the preferred proportion is from about 30 to about 33 per cent of the composition. In a composition of the invention comprising a polymerizable unsaturated polyester the proportion of coated cellulose filler may range from about 5 to about 50 per cent of the composition, but the preferred proportion is from about 20 to about 40 per cent of the composition.

If desired, part of the coated cellulose filler used in compositions embodying the invention may be replaced by an ordinary, uncoated cellulose filler, or a mineral filler in granular form such as silica, clay, mica, or ground glass, or a mineral filler in fiber form such as glass fibers or asbestos. When part of the coated cellulose filler is replaced by another filler, the proportion of total filler is within the range hereinbefore described, but the proportion of the coated cellulose filler in the total filler should be such that it comprises at least 5 per cent of the composition.

If desired, the total proportion of coating agent may be applied to only half of the amount of cellulose filler that would ordinarily be used in a composition of the invention. The coated filler may then be impregnated with a polar thermosetting substance, dried and then ground with a similar molding compound containing, however, untreated cellulose filler. Such a procedure results in a molding composition which has the same improvement in properties that is obtained by using a mixture of coated and uncoated cellulose fillers in the method of the invention.

To a product embodying the invention, having the composition hereinbefore described, the usual proportions of opacifiers, lubricants, curing catalysts, pigments and other coloring matter may be added.

In the production of a molding compound embodying the invention the mixing and impregnating of the coated cellulose filler with the polar thermosetting substance may be carried out by any of the known methods. If the binder is insoluble but still fusible, or if the binder is a very viscous polymerizable polyester composition, it may be milled with the coated cellulose filler on a heated two-roll (differential speed) rubber mill in order to impregnate the filler. It may be desirable to heat a very viscous polyester in order to reduce the viscosity sufficiently to permit the use of other mixing procedures. Ordinarily the viscosity of a polyester is such that kneading or equivalent mixing procedures may be used satisfactorily.

In some cases it may be desirable to dilute a very viscous polyester with a solvent in order to facilitate mixing with the coated cellulose filler. The coated cellulose filler may also be mixed with a thermosetting phenolic resin solution before the condensation of the resin has been carried to the point at which the product is a solid, or the phenolic condensation product may be incorporated in the filler by using an organic solvent (e. g., glycol monoethyl ether, furfuryl alcohol, a high boiling hydrocarbon, gasoline, or a hydrogenated phenol) in one of the usual mixing processes (e. g., (a) by wetting the filler with the solvent and then adding the dry resin to the filler, (b) by dissolving the resin in the solvent and impregnating the filler with the solution, or (c) by impregnating part of the filler with the resin solution, drying, and mixing with the rest of the filler). In mixing a phenolic resin with a filler, high boiling aldehydes (e. g., furfural and benzaldehyde) may be used as wetting agents, serving not only as solvents for the resin but also as plasticizers and supplementary hardening agents.

When the binder is a resinous reaction product of formaldehyde with a substance whose molecule contains a plurality of $NH_2$ groups, the coated cellulose filler may be impregnated with an aqueous solution of the resinous material (preferably the solution has a pH of about 4 to about 6) and then dried. Heat may be used to facilitate the drying of the impregnated filler but, of course, the drying temperature should not be sufficient to render a thermosetting molding composition infusible. The dry product may then be ground in a ball mill to produce a homogeneous powder.

The following examples illustrate the production of molding compositions of the invention by the method of the invention.

*Example 1*

A molding compound of the invention is prepared by the following procedure: A solution of 1 mol of melamine in formalin (37 per cent aqueous formaldehyde solution) containing 3 mols of formaldehyde is held at 80° C. for ten minutes at a pH of 7. The resulting reaction product is diluted with water to a solids concentration of about 50 per cent, and the diluted solution (200 parts) is used to impregnate a coated alpha cellulose filler (40 parts, prepared by treating alpha cellulose with an aqueous solution of Zelan, by the procedure hereinbefore described for the preparation of a Zelan-coated rag filler). The impregnated material is thoroughly dried and is then ground in a ball mill to produce a homogeneous powder, which is compression molded into test pieces by the procedure hereinbefore described.

For the sake of comparison with the above molding compound of the invention (hereinafter referred to as compound C), a molding compound, D (a control), is prepared and molded into test pieces by a procedure that is the same as that described in the preceding paragraph except that the coated cellulose filler is replaced by an untreated alpha cellulose filler (40 parts).

Several two inch diameter disks of compositions C and D are immersed in boiling water for one hour and then baked at 180° F. for one hour. In Table 2 (below) the water absorption (as the gain in weight in grams during the immersion) is given for test disks molded for two minutes (column 2), three minutes (column 3), four minutes (column 4), five minutes (column 5) and seven minutes (column 6). Those disks which cracked upon baking for 1 hour are indicated in Table 2 by the letters "cr." inserted after the water absorption results.

TABLE 2

*One hour boiling water absorption*

| Composition | Molding Cure | | | | |
|---|---|---|---|---|---|
| | 2 min. | 3 min. | 4 min. | 5 min. | 7 min. |
| C | 0.045 | 0.040 | 0.045 | 0.045 | 0.045 |
| D (control) | 0.055 | 0.050 | 0.055 cr. | 0.060 cr. | 0.060 cr. |

As the results in Table 2 indicate, a coated cellulose filler in a composition of the invention has no deleterious effect on the water resistance of articles molded from the composition. Furthermore, articles molded from the composition show relatively good resistance to cracking upon baking for one hour at 180° F. after one hour of immersion in boiling water.

Other two inch diameter test disks of compounds C and D are subjected to long cures in a mold heated with 75 pounds of steam. Disks molded from compound C and cured for as long as 45 minutes are not harmfully affected, and after 60 minutes are slightly affected but not cracked. However, disks molded from compound D are slightly cracked after curing for 20 minutes and are badly cracked after 30 minutes.

The flexural strength of test pieces molded as hereinbefore described from compounds C and D (small bars, ¼" x ½" x 6") is tested as follows: Each bar is supported at its extremities, and a transverse load is applied centrally. The flexural strenth "S" is the extreme fiber stress in pounds per square inch at which the bar fails, calculated according to the formula $$S = \frac{3wl}{2ba^2}$$

in which "w" is the load in pounds, "l" is the length in inches of the bar or span between the supports, "b" is the horizontal dimension in inches of the cross section of the bar and "a" is the vertical dimension in inches of the cross section of the bar. The flexural strength of compound C is approximately 14,300 pounds per square inch, while the flexural strength of compound D is approximately 13,000 pounds per square inch.

*Example 2*

A solution of 2 mols of urea in formalin (37 per cent aqueous formaldehyde solution) containing 3 mols of formaldehyde is held at 30° C. and at a pH of about 7 for six hours. The reaction product so obtained (120 parts) is used to impregnate a coated alpha cellulose filler (70 parts of a Zelan-coated alpha cellulose filler prepared as described in the preceding example), and the impregnated material is thoroughly dried. The dried compound is ground in a ball mill to produce a homogeneous powder which may be compression molded to produce articles having superior impact strength.

*Example 3*

A material embodying the invention comprising a polymerizable unsaturated polyester and a coated cellulose filler may be prepared by carrying out the following procedure: A polymerizable unsaturated linear polyester is prepared by the procedure hereinbefore described from a charge consisting of 1.05 mols of monoethylene glycol, one mol of maleic anhydride and an amount of hydroquinone equal to 0.04 per cent of the charge. The charge is heated to 220° C. (over a period of two hours) and is held between 220° C. and 226° C. for six more hours. The resulting polyester (95 parts), which has an acid number of about 35, is cooled to 60–70° C. and is mixed thoroughly with diallyl phthalate (5 parts) and a paste of tricresyl phosphate (2 parts) and benzoyl peroxide (2 parts), as a catalyst, to form a solution. A composition consisting of the polymerizable polyester solution so prepared, an amount of a coated cellulose filler (a Zelan-coated rag filler prepared by the procedure hereinbefore described) equal to approximately 50 per cent of the composition and, as a lubricant, an amount of zinc stearate equal to 2 per cent of the composition, is then milled on a heated two-roll differential speed rubber mill at the lowest temperature at which a homogeneous mass can be obtained (not more than about 75° C.). The resulting composition is removed in sheets, is allowed to solidify fully while at about 80–90° F. and then is granulated in a high-speed cutter to a maximum particle diameter of about ⅛ inch. The granulated composition so obtained may be compression molded to produce articles having superior impact strength.

*Example 4*

A composition embodying the invention comprising a thermosetting phenolic resin and a coated cellulose filler may be prepared by the following procedure: A solution consisting of formalin (1460 grams of a 37 per cent aqueous solution of formaldehyde) phenol (2400 grams of a 94 per cent phenol) and sulfuric acid (120 grams of a 20 per cent aqueous solution) is rapidly stirred for 70 minutes with cooling, keeping the temperature at approximately 60° C. Then the mixture is maintained at a temperature of about 90° C. for 60 minutes more with rapid stirring. The solution separates into two phases after about 30 minutes at 60° C. The evolution of heat gradually decreases so that it is necessary to supply heat for the last 30 minutes in order to maintain the mixture at a temperature of 90° C. Next, after the addition of an alkali (1080 grams of a 20 per cent aqueous solution of sodium hydroxide), the mixture is stirred or allowed to stand until a homogeneous solution has formed. Then formalin (1460 grams) is added. The solution is then heated to 75° C., held at that temperature for 60 minutes, and then cooled to room temperature. The odor of formaldehyde disappears after about 45 minutes at 75° C. The resulting resinous solution, having a concentration of about 55 per cent solids, is used to impregnate a coated cellulose filler (a Zelan-coated rag filler prepared by the procedure hereinbefore described) which is used in an amount equal to about 35 per cent of the composition. The impregnated material is thoroughly dried to produce a composition which may be compression molded to produce articles having superior impact strength.

I claim:

1. A molding composition comprising (A), as a filler, cellulose fibers and (B), as a binder impregnating the filler, a polar thermosetting material of the class consisting of phenol-formaldehyde reaction products, unsaturated polyhydric alcohol-polycarboxylic acid polyesters, and reaction products of formaldehyde with a compound whose molecule has a plurality of $NH_2$ groups each connected to a carbon atom which in turn is connected by a double bond to an atom having an atomic weight from 14 to 16, in proportions of 0.5 to 2.0 mols of formaldehyde per $NH_2$ group; the cellulose fibers having bonded thereto from 2 to 10 per cent of their weight of octadecyloxymethyl pyridinium chloride for reducing the strength of the bond between the polar thermosetting material and the cellulose fibers, and the weight ratio of coated cellulose fibers to (B) being from 1:1 to 1:19.

2. A molding composition comprising (A), as a filler, cellulose fibers and (B), as a binder impregnating the filler, a reaction product of formaldehyde with a compound whose molecule has a plurality of $NH_2$ groups each connected to a carbon atom which in turn is connected by a double bond to an atom having an atomic weight from 14 to 16, in proportions of 0.5 to 2.0 mols of formaldehyde per $NH_2$ group; the cellulose fibers having been treated, prior to impregnation by the binder, by reaction therewith of from 2 to 10 per cent of their weight of octadecyloxymethyl pyridinium chloride, and the weight ratio of treated cellulose fibers to (B) being from 1:1 to 1:19.

3. A composition as claimed in claim 1 wherein the filler comprises fragments of a woven fabric.

4. A composition as claimed in claim 2 wherein the filler comprises fragments of a woven fabric.

5. A method of producing a molding composition that comprises impregnating a fibrous cellulose filler with from 1 to 19 times its weight of a polar thermosetting material of the class consisting of phenol-formaldehyde reaction products, unsaturated polyhydric alcohol-polycarboxylic acid polyesters, and reaction products of formaldehyde with a compound whose molecule has a plurality of $NH_2$ groups each connected to a carbon atom which in turn is connected by a double bond to an atom having an atomic weight from 14 to 16, in proportions of 0.5 to 2.0 mols of formaldehyde per $NH_2$ group; the cellulose filler having bonded thereto from 2 to 10 per cent of its weight of octadecyloxymethyl pyridinium chloride for reducing the strength of the bond between the polar thermosetting material and the cellulose filler.

6. A method of producing a molding composition that comprises (1) pretreating cellulose fibers by reaction therewith of from 2 to 10 per cent of their weight of octadecyloxymethyl pyridinium chloride, (2) impregnating the fibers with an aqueous solution containing from 1 to 19 times their weight of a reaction product of formaldehyde with a compound whose molecule has a plurality of $NH_2$ groups each connected to a carbon atom which in turn is connected by a double bond to an atom having an atomic weight from 14 to 16, in proportions of 0.5 to 2.0 mols of formaldehyde per $NH_2$ group, and then (3) drying; the substance thus bonded to the fibers during step (1) having the effect of reducing internal impregnation that leads to embrittlement of the cellulose fibers and reducing the strength of the bond between the reaction product and the fibers so as to increase the impact strength of articles molded from the composition.

7. A method as claimed in claim 5 wherein the filler comprises fragments of woven fabric.

8. A method as claimed in claim 6 wherein the filler comprises fragments of woven fabric.

9. A composition as claimed in claim 2 wherein the compound whose molecule has a plurality of NH₂ groups is urea.

10. A composition as claimed in claim 2 wherein the compound whose molecule has a plurality of NH₂ groups is melamine.

11. A method as claimed in claim 6 wherein the compound whose molecule has a plurality of NH₂ groups is urea.

12. A method as claimed in claim 6 wherein the compound whose molecule has a plurality of NH₂ groups is melamine.

THEODORE C. BAKER.

References Cited in the file of this patent

UNITED STATES PATENTS

| Number | Name | Date |
|---|---|---|
| 1,173,337 | Bonner | Feb. 29, 1916 |
| 1,930,069 | Walsh | Oct. 10, 1933 |
| 2,037,740 | Salzberg | Apr. 21, 1936 |
| 2,288,695 | Fuller | July 7, 1942 |
| 2,312,688 | D'Alelio | Mar. 2, 1943 |
| 2,327,738 | Perry | Aug. 24, 1943 |
| 2,384,115 | Muskat | Sept. 4, 1945 |
| 2,512,195 | Bener | June 20, 1950 |

FOREIGN PATENTS

| Number | Country | Date |
|---|---|---|
| 1,598 of 1912 | Great Britain | Mar. 20, 1913 |